United States Patent [19]

Hegedüs

[11] Patent Number: 4,518,176
[45] Date of Patent: May 21, 1985

[54] VEHICLE WITH ECCENTRICALLY MOUNTED WHEELS

[75] Inventor: Károly Hegedüs, Budapest, Hungary

[73] Assignee: Aranykalasz Mgtsz, Rackeve, Hungary

[21] Appl. No.: 413,354

[22] PCT Filed: Dec. 16, 1981

[86] PCT No.: PCT/HU81/00046
§ 371 Date: Aug. 16, 1982
§ 102(e) Date: Aug. 16, 1982

[87] PCT Pub. No.: WO82/02027
PCT Pub. Date: Jun. 24, 1982

[30] Foreign Application Priority Data

Dec. 16, 1980 [HU] Hungary .......................... 2999/80

[51] Int. Cl.³ ............................................. B62M 1/18
[52] U.S. Cl. ................... 280/229; 280/220; 280/221
[58] Field of Search ............... 280/220, 221, 226 R, 280/229; 244/100 R, 108, 17.17

[56] References Cited

U.S. PATENT DOCUMENTS

| 1,223,949 | 4/1917 | Flagg | 280/229 |
| 1,498,427 | 6/1924 | Dean | 280/220 |
| 1,759,740 | 5/1930 | Foltz | 280/229 |
| 2,555,480 | 6/1951 | Fischer | 280/229 |
| 3,173,632 | 3/1965 | Woods | 244/100 R |

Primary Examiner—Joseph F. Peters, Jr.
Assistant Examiner—Donn McGiehan
Attorney, Agent, or Firm—Murray Schaffer

[57] ABSTRACT

A vehicle having a chassis divided into a front and rear section pivoted together. At least one of the sections having a crank driving system consisting of a pair of driving wheels attached with opposite eccentricity to a common driving shaft, which shaft supports one of the chassis sections. The axis of the driving shaft connects the wheels intersects a theoretical line passing through the center of the driving wheels at an acute angle and one wheel is fixed non-rotatably to the shaft while the other driving wheel is attached for free rotation relative to the shaft.

9 Claims, 7 Drawing Figures

VEHICLE WITH ECCENTRICALLY MOUNTED WHEELS

BACKGROUND OF THE INVENTION

The present invention relates to crank operated vehicles such as a wheeled cart used by children, athletes, disabled persons as well as those requiring locomotion in public places, such as railway terminals and airports.

There are several types of non-motorized vehicles; one such type is generally characterized by the fact that propulsion is effected by the physical strength of the operator, whose power is transmitted directly through an arm with the use of a rod system or chain. The torque thus created ensures the propulsion of the vehicle. Such vehicles are generally known as bicycles or trolleys. Recently another type of sporting and toy-vehicles for children has become known, the chassis of which is formed by flat surface and the wheels are fixed to the axle supporting the chassis eccentrically with the eccentricity of each wheel being in opposition to the other. Propulsion of the vehicle is provided by transferring the center of gravity of the operator's body, the operator standing or sitting on the chassis, while the vehicle performs a rocking motion around the longitudinal axis of the chassis. The eccentric fastening of the wheels actually forms lever arms which are loaded alternately with the power given by transferring the weight of the body. The forces developed by the load create a torque, that keeps the vehicle in motion. The disadvantage of this vehicle, is its unsteerability, e.g. running in a predetermined track or direction is impossible. Thus, it did not gain general acceptance either as a toy, a vehicle or as an exercise device.

The present invention has as its object the improvement of such vehicles as hereinbefore described having a chassis and at least one drivable crank system consisting of a pair of driving wheels fixed with opposite eccentricity to the driving shaft supporting the chassis.

It is a further object to provide a vehicle of the type described in which its steerability is improved and can be driven in a straight line or track.

SUMMARY OF THE INVENTION

Thus the invention provides a vehicle especially for children, athletes, disabled persons and the requiring locomotion anywhere comprising a chassis having a front and rear section as well as at least one crank driving system consisting of a pair of driving wheels attached with opposite eccentricity to a common driving shaft, which shaft supports one of the chassis sections. The essence of the invention lies in the fact that the axis of the driving shaft connecting the wheels intersects a theoretical line passing through the center of the driving wheels at an acute angle and one wheel is fixed non-rotatably to the shaft while the other driving wheel is attached for free rotation relative to the shaft.

In one embodiment of the invention at least one end of the driving shaft is formed having an integral an eccentric arm and is provided with a bearing stub at its end, on which the freely journalled which is coaxially mounted. An oppositely directed eccentric arm may also be formed at the "fixed" end of the driving shaft. If so, the shaft is provided with a fixed a bearing stub to which the non rotatable wheel is coaxially fixed.

In another embodiment, the rotatable wheel comprises a outer peripheral annulus and a central hub. The shaft is eccentrically fixed to the hub which has a greater radius than the extent of eccentricity. The second annulus is journalled about the hub as to allow its free rolling relative thereto around its center.

It is preferable, to form the front section of the chassis as a steerable carriage having a handle and the rear section with at least one-two wheel support and crank assembly connected so as to tilt around the longitudinal axis of the vehicle. Added entertainment and exercise for children, athletes and the like can be obtained by having the steerable carriage formed with an additional two wheel support and crank assembly pivotable around a vertical axis.

It is advantages to arrange one of the driving wheels of crank assembly for the steerable section to be journalled freely rotatable on a bearing stub of an eccentric arm formed at one end of the driving shaft, while releasably fixing the other driving wheel with a clamp on a bearing stub on the eccentric arm forming the other end of the driving shaft, so that it too can be made to freely turn when the clamp is released.

The vehicle of the present invention ensures rolling of the wheels on a variety of roads and at the same time the steerable mechanism allows the use of the vehicle on a predetermined track. Construction of the crank according to the invention allows the driving shaft of the vehicle to be journalled freely on the bearings fixed directly to the chassis section or a platform on which the operator stands, kneels or sits.

The vehicle according to the invention can also be constructed as to allow the already described crank to be pivotably connected to the chassis around a vertical pivot axis as well as the tilting or swinging motion around the horizontal axis.

A great advantage of the vehicle according to the invention is that by its simplicity of construction and operation as well as steerability it can be used as an independent vehicle, e.g. for disabled persons, or as an ordinary vehicle, apart from being favoured as a toy or exercise device. Thus, for instance, it can be used to advantage in railway stations and airports for the transport of passengers and parcels. Further advantage is that the vehicle when used as an exercise device develops the sense of rhythm in its user. By using multiple driving crank assemblies the vehicle becomes suitable for common exercise or athletic programs and as such it can be used as communal training device.

DESCRIPTION OF THE INVENTION

Figure 1:
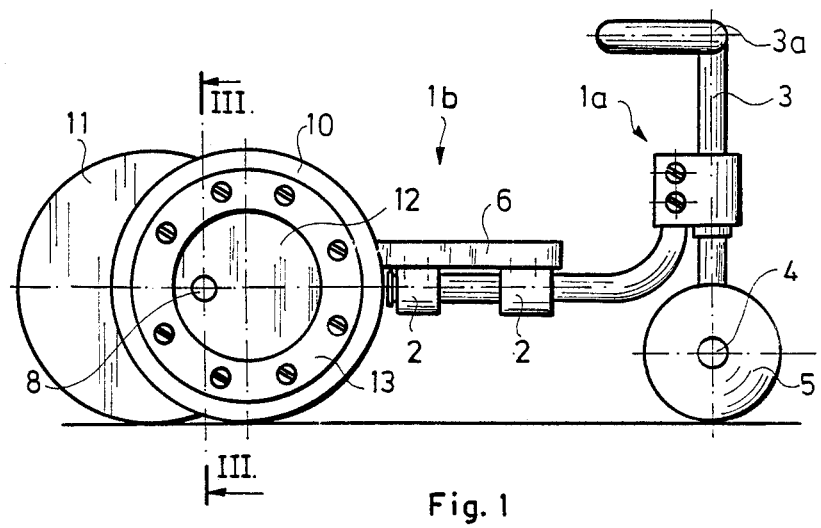
FIG. 1 is a side elevation view of a vehicle embodying the present invention.
Figure 2:
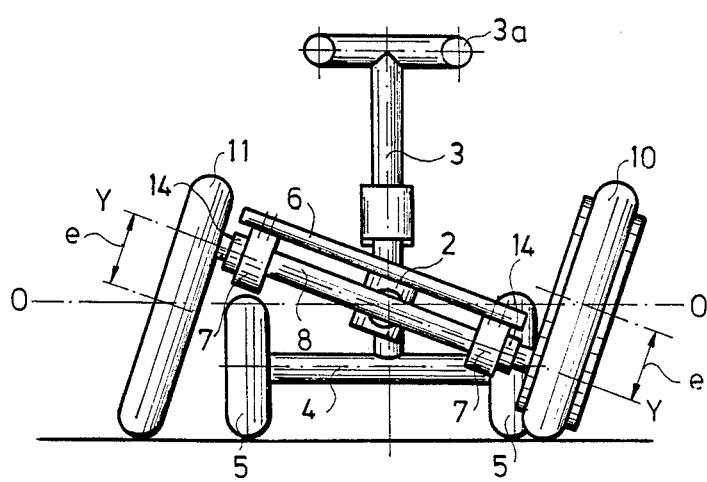
FIG. 2 is a rear elevational view of the vehicle shown in FIG. 1.
Figure 3:
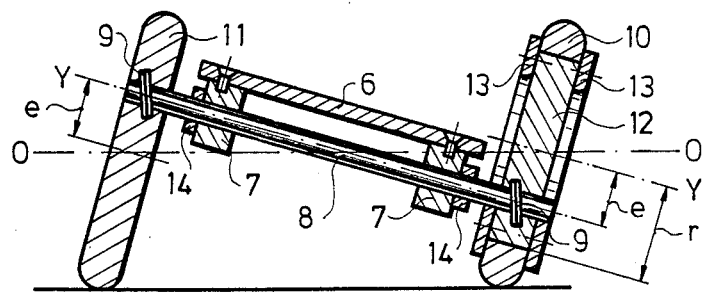
FIG. 3 is a partial section along line III—III of FIG. 1.

As seen in FIGS. 1-3, the vehicle comprises a chassis 1 having a forward section 1a and a rear section 1b. The forward section is articulated so that it is steerable comprising a central a post 3 to the upper end of which is attached a handle 3a and to the lower end of which is attached a transverse axle 4 on each end of which is a freely rotatable wheels 5. Extending rearwardly from the post 3 is a connecting bar 3b extending in a horizontal axis X—X which is supported in bearings 2 secured to the bottom of a platform 6 of the rear section comprising a part of the driving crank assembly.

The driving crank assembly consists of a driving crank, a pair of spaced bearings 7 mounted to depend from the bottom surface of the platform 6, in which is freely journalled an axle shaft 8 to the ends of which is eccentrically fixed, by pins 9, wheels 10 and 11 respectively. The axis Y—Y of the driving shaft 8 is arranged at an acute angle to an imaginary line O—O extending through the center of the driving wheels 10 and 11 intersecting the axis Y—Y of the shaft 8 between the driving wheels 10, 11, preferably at its midpoint and coinciding with the horizontal axis X—X of the connecting bar 3a.

One wheel 11 has a unitary wheel structure directly secured to the shaft 8 at a distance e eccentric from its center. The other wheel 10 is formed with a freely rotatable circular inner hub 12 concentric with the wheel 10. The hub 12 has a radius r greater than the distance e of eccentricity and is held within the wheel 10 by a pair of annular disc-like side walls 13 fastened as by bolts to the hub 12 and extending radially over the sides of the wheel 10. The hub 12 is eccentrically secured to the shaft 8 by the pin 9, at a distance e from its center, equal to that of the eccentricity of wheel 11 but in a radially opposite direction. Thus, while the wheel 10 wedges upwardly due to the eccentricity of the hub 12, the wheel itself is freely rotatable about is center on the surface of the hub 12. The lateral displacement of the driving shaft 8 journalled in bearings 7 is prevented by retainer rings 14.

Though not shown in the drawings, the chassis 1 of the vehicle according to the invention may be provided with a saddle or a seat.

The person using the vehicle according to the invention stands on the platform 6 of the rear chassis section placing his hands on the handle 3a of the steering mechanism. Next he transfers the weight of his body to the higher edge of the platform 6 which is at an angle to the horizontal (FIG. 2) due to the eccentricity of the driving wheels 10 and 11. The lever arm created by the eccentricity is now loaded with the weight of the person using the vehicle, and the torque thus created sets the vehicle into motion. As soon as the vehicle is set into motion, the rising edge of the platform 6 will slowly swing or tilt around the longitudinal axis X—X of the chassis from its upper position into a lower position, while the other, opposite edge of the platform 6 will rise. By transferring the center of gravity, to the edge now in the upper position the platform will again be subjected to load. As a result of the loading the higher half of the platform 6 will descend, thereby bringing about the further rolling of the vehicle. The vehicle is driven by repeating this rhythmic transfer of the center of gravity.

During driving or motion of the vehicle, the axis of the driving shaft 8 generates a pair of conical surfaces about the imaginary lines O—O with the horizontal axis Y—Y as its center. The two cones point towards each other and having an identical radius at the distance e of eccentricity. Since however the driving shaft 8 is rotatably journalled in bearings 7, it can not move away in relation to the platform 6, thus, even when the vehicle travels in a straight line, the driving wheels 10 and 11 will either be fast or slow in relation to each other. The effect of this wheel-turning difference on the motion of the vehicle is eliminated by the outer "tires" of driving wheel 10 which is capable of turning freely around its center, about the hub 12, which is fixed to the shaft.

In case of a curved track, the road length differences in the curve are completely eliminated by the construction according to the invention and steering is simple, with simple movement of the steering mechanism.

Figure 4:
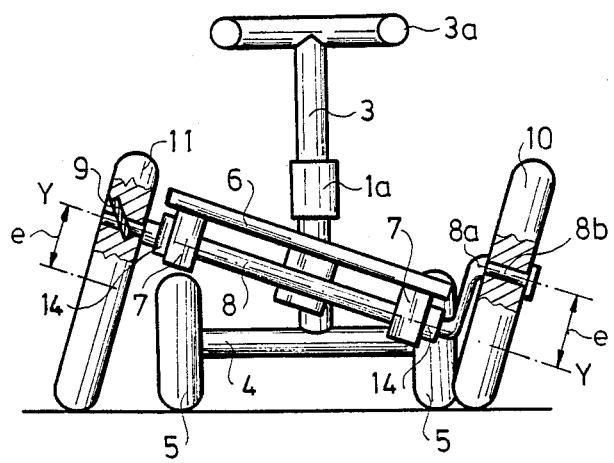
FIG. 4 is a rear view of a vehicle embodying the the invention in another form.

FIG. 4 shows another embodiment wherein the overall structural formation of the vehicle is similar to that of the embodiment of FIGS. 1–3. The only difference is that the rotatable wheel 10 is connected to a crank arm 8a extending integrally from the driving shaft 8. The size of the crank arm 8a is identical with the eccentricity e at which the wheel 11 is fixed to the shaft 8. The wheel 10 is freely journalled at its center on a stub shaft 8b of the eccentric arm 8a. The driving wheel 11 is firmly fixed with pin 9 as described in connection with FIGS. 1–3 to the other end of the driving shaft 8.

The construction shown in FIG. 4, operates as earlier described and eliminates road differences by having the driving wheel 10 freely turning around its center similar as in the earlier embodiment.

Figure 5:
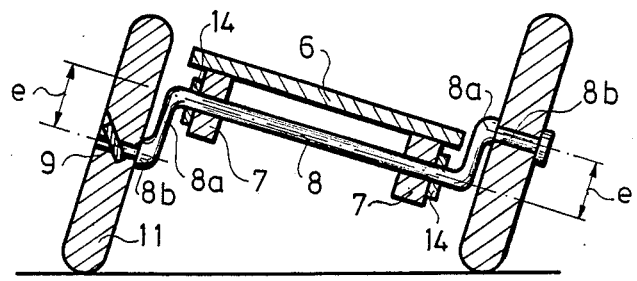
FIG. 5 is a partial section of the vehicle shown in FIG. 4, taken along V—V.

Naturally both ends of the driving shaft 8 can be formed with an eccentric arm 8a corresponding to the eccentricity e, and with bearing stub 8b as seen in FIG. 5. In this case only one wheel i.e., wheel 10 freely rotates around its center journalled on bearing stub 8b, while the wheel 11 is fixed, at its center by pin 9 a fixed bearing stub 8b at the other end of the driving shaft 8. The great advantage of the construction of FIG. 5 is that the wheels 10 and 11 are completely identical, which significantly facilitates the production of the vehicle. A further advantage is that both the freely turning wheel 10 and the fixed wheel 11 are centrally fixed to the driving shaft 8.

Figure 6:
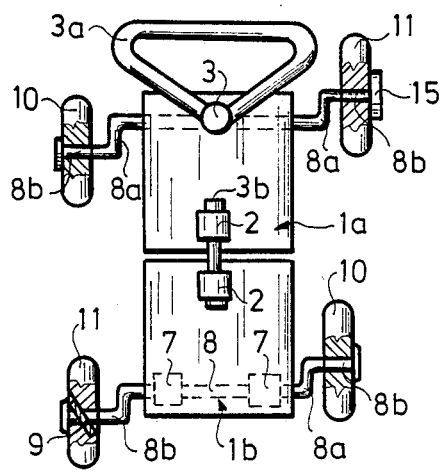
FIG. 6 is a top plan view embodiment of a vehicle employing the present invention.

In the embodiment shown in FIG. 6, the forward section 1a is constructed similar to the rear section in that a platform is supported by a driving crank assembly consisting of a second driving shaft 8 having eccentrically connected driving wheels 10 and 11. Here too both driving shafts 8 are journalled in bearings 7 and retaing rings 14. Both platforms are tiltably journalled about a horizontal connecting bar 3b in journals 2. In this construction the driving may be done separately by two persons each in the manner as described above. The steering may be carried out in such a way, that one of the persons drives his crank assembly at a faster or slower rate according to the desired direction.

Naturally, the steering may also be effected with separately formed steering mechanism such as that shown in FIG. 1. In this case the crank assembly associated with steerable section is connected by conventional method to be pivotable about a vertical axis of a post 3. Naturally the steering can be solved also by forming the rear section with a steering mechanism pivotable about a vertical axis as indicated by post 16 in FIG. 7.

Steering may be further facilitated when the "fixed" wheel 11 is fixed by a clamp 15, (instead of a pin 9) to the driving shaft 8 associated with the steering mechanism as seen in FIG. 6. In this case upon releasing the clamp 15, the "fixed" wheel 11 similarly to the other wheel 10 is also capable of rotating freely around its center and thus the driving crank provided in association with the steering mechanism is transformed into a vehicle similar to a bicycle provided with simple free running forward wheels. This construction simplifies not only the steering, but at the same time it allows the use of the vehicle equally by one or two persons.

Figure 7:
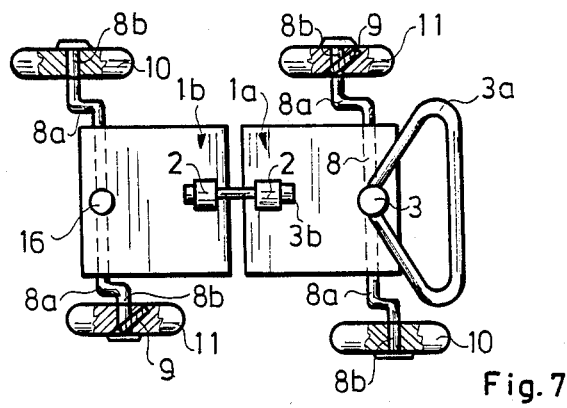
FIG. 7 is a top view of still another vehicle according to the invention.

In the embodiment shown in FIG. 7, which although similar to that of FIG. 6 has the driving cranks suspended in each of the forward and rear section so as to pivot freely to the right and left around the vertical axis. In case of such suspension or journalling of the driving shafts 8 relative to vertical posts 3 and 16, the driving shaft 8 will roll about the surfaces of the two cones facing each other, while the driving wheels 10 and 11 are either fast or slow in relation to each other. This construction is particularly advantageous in a vehicle forming an exercising device, since it develops a sense of rhythm.

The invention is not restricted to the described embodiments since the vehicle according to the invention may be formed in any other way within the limits of the invention. Thus for instance several vehicles according to the invention can be interconnected in snake like train as well, which is significant in respect of mass entertainment.

I claim:

1. A vehicle comprising a chassis having a forward section, and a rear section connected to said forward section said rear section having a platform mounted for tilting movement about a horizontal axis, a freely rotatable shaft suspended from said platform and having a wheel attached thereto at each end, the centers of each wheel being eccentric by a predetermined distance from the axis of said shaft in radially opposite directions, the axis of said shaft extending at an acute angle to the line connecting the center of each wheel, one of said wheels being fixed to said shaft to rotate conjointly with said shaft, said other wheel being freely rotatable about the center of said wheel.

2. The vehicle according to claim 1, wherein said shaft is formed at one end with an integral crank arm, having a bearing stub eccentrically offset from the axis of said shaft by said predetermined distance, said other wheel being journalled concentrically on its associated bearing stub for free rotation thereabout.

3. The vehicle according to claim 1, wherein each end of said bearing shaft is formed with an integral crank arm having a bearing stub eccentrically offset from said shaft by said predetermined distance, the crank arm at one end extending in a direction opposite to that of the other crank arm, said one wheel being fixed concentrically on the bearing stub at one end of said shaft, the other wheel being journalled concentrically on the bearing stub at the other end of said shaft for free rotation thereabout.

4. The vehicle according to claim 1, wherein the other wheel comprises a central circular hub having a radius greater than the predetermined distance of eccentricity, an outer annular member freely slidable on the periphery of said hub about the center of said hub, said shaft being fixed to said central hub at the predetermined distance from the center thereof.

5. The vehicle according to claim 1 wherein said forward section is steerable, and is provided with a platform having a freely rotatable shaft suspended from said platform and having a wheel attached thereto at each end, the centers of each wheel being eccentric by a predetermined distance from the axis of said shaft in radially opposite directions, the axis of said shaft extending at an acute angle to the line connecting the center of each wheel, one of said wheels being fixed to said shaft to rotate conjointly to said shaft, said other wheel being freely rotatable about the center of said wheel.

6. The vehicle according to claim 5, wherein said shaft is formed at one end with an integrally crank arm, having a bearing stub eccentrically offset from the axis of said shaft by said predetermined distance, said other wheel being journalled concentrically on said bearing stub for free rotation thereabout.

7. The vehicle according to claim 5, wherein each end of said bearing shaft is formed with an integral crank arm having a bearing stub eccentrically offset from said shaft by said predetermined distance, the crank arm at one end of said shaft extending in a direction opposite to that of the other of said shaft, said one wheel being fixed concentrically on the bearing stub at one end of said shaft, the other wheel being journalled concentrically on the bearing stub at the other end of said shaft for free rotation thereabout.

8. The vehicle according to claim 5, wherein the other wheel comprises a central circular hub having a radius greater than the predetermined distance of eccentricity, an outer annular member freely slidable on the periphery of said hub about the center of said hub, said shaft being fixed to said central hub at the predetermined distance from the center thereof.

9. The vehicle according to claim 5, wherein said rear chassis section is steerable, said platform being pivotally attached to a vertical post rotatable about a vertical axis and provided with a handle.

* * * * *